(12) United States Patent
Ahmed et al.

(10) Patent No.: US 12,704,609 B2
(45) Date of Patent: Aug. 11, 2026

(54) TIME OF FLIGHT DISTANCE DETERMINATIONS

(71) Applicant: Intel Corporation, Santa Clara, CA (US)

(72) Inventors: Shabbir Ahmed, Beaverton, OR (US); Vuk Lesi, Cornelius, OR (US); Christopher Noe Gutierrez, Hillsboro, IN (US); Ignacio J. Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 18/145,858

(22) Filed: Dec. 23, 2022

(65) Prior Publication Data

US 2024/0210536 A1 Jun. 27, 2024

(51) Int. Cl.
*G01S 17/14* (2020.01)
*G01S 7/4865* (2020.01)

(52) U.S. Cl.
CPC ............ *G01S 7/4865* (2013.01); *G01S 17/14* (2020.01)

(58) Field of Classification Search
None
See application file for complete search history.

(56) References Cited

U.S. PATENT DOCUMENTS

2018/0096489 A1* 4/2018 Cohen .................. G01S 17/894
2018/0217260 A1* 8/2018 Price ...................... G06T 7/521
2021/0293939 A1* 9/2021 Jo ......................... G01S 7/4865
2023/0221416 A1* 7/2023 Park ...................... G01S 7/4815
356/4.01

OTHER PUBLICATIONS

Gardill, Markus et al.; "An Approach to Over-the-air Synchronization of Commercial Chrip-Sequence Automotive Radar Sensors"; https://ieeexplore.ieee.org/document/9037593; retrieved on Nov. 7, 2022; dated Jan. 2020; IEEE Topical Conference on Wireless Sensors and Sensor Networks (WiSNeT); pp. 46-49.

* cited by examiner

*Primary Examiner* — Eileen M Adams
(74) *Attorney, Agent, or Firm* — Viering, Jentschura & Partner mbB

(57) ABSTRACT

A device includes a sensor, configured to detect electromagnetic radiation originating from a source external to the device and reflected from an object; and to generate an electrical signal representing the detected electromagnetic radiation; and a processor, configured to determine a distance between the device and the object based on the electrical signal.

18 Claims, 4 Drawing Sheets

TIME OF FLIGHT DISTANCE DETERMINATIONS

TECHNICAL FIELD

Various aspects of this disclosure generally relate to Time of Flight (TOF) distance calculations between an object and either the transmitter or a receiving device, when the TOF signal originates externally to both the object and the receiving device.

BACKGROUND

TOF describes the time that a signal (e.g. electromagnetic radiation, an acoustic wave, etc.) travels from a point of origin to a point of receipt. Since the velocity of signal propagation depends on the type of signal (e.g., electromagnetic radiation, acoustic wave, etc.) and the medium through which it travels (e.g. a vacuum, air, water, etc.), the velocity of a signal (e.g., radio signals or light/lasers travel at the speed of light) is generally known and can be used to convert TOF to distance. In this manner, TOF calculations can be used to determine relative distances between objects. TOF can also be used to determine a distance between a TOF device and an object off of which the TOF signal reflects. Conventionally, this is done using a device that both generates the TOF signal and receives the reflected TOF signal. Because this conventional configuration for detecting the distance between a TOF device and an object off of which the TOF signal reflect assumes both generation and receipt of the TOF signal in the same device, conventional TOF devices disregard emissions of neighboring devices as interference. Various interference suppression techniques aim at filtering detected signals not originating from the ego sensor (e.g., receiving sensor for the TOF calculation). Thus, at least in the context of determining a distance between a TOF device and an object off of which the TOF signal reflects, signals from external devices are not used or useable to the TOF device.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
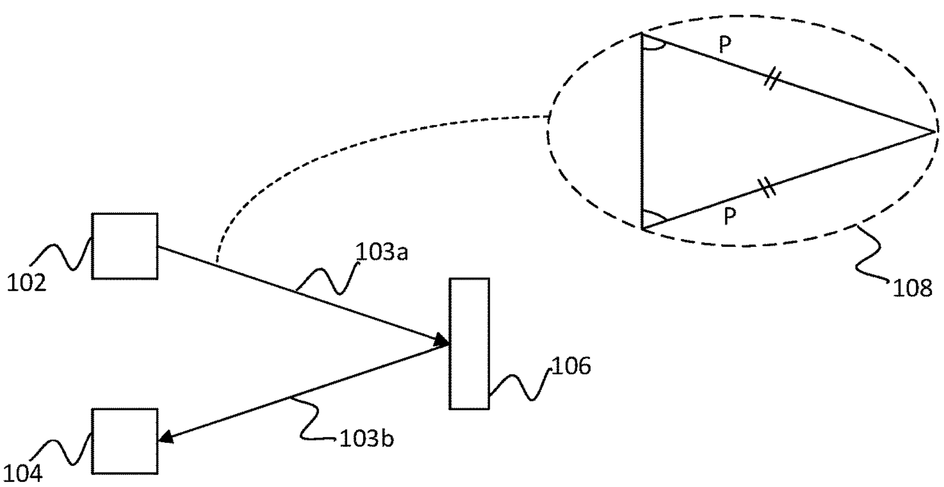
FIG. 1 depicts TOF distance calculation according to the first case.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "sensor" as used herein may refer to any device that is configured to detect a phenomenon in its surroundings and to generate an electrical signal representing the phenomenon. Such phenomena may include electromagnetic radiation (e.g. visible light, non-visible light, radio waves, etc.), acoustic waves, or mechanical waves. The TOF detection as described herein may be performed with any of a variety of sensors. Such sensors include, but are not limited to, a receiver/transceiver (e.g., for detection of radio signals), a Radio Detection and Ranging (RADAR) sensor (e.g., for detection specifically of RADAR radio signals), a light sensor/photo sensor (e.g. for detection of light, lasers, etc.), a microphone/piezoelectric sensor (e.g., for detection of acoustic waves), etc.

The term "source" as used herein may refer to any device that is configured to generate a signal complementary to the sensor described above. For example, a transmitter/transceiver may be used to generate a radio signal to be received by a radio sensor (e.g. a receiver/transceiver, RADAR sensor, etc.); a laser or other light generation device may be used to generate the signal to be received by a light sensor/photo sensor; an acoustic vibration generator (e.g. a speaker) may be used to generate a signal to be received by a microphone/piezoelectric sensor. In this manner, the source and the sensor may be matched such that the ego device, in which the sensor is located, can determine a TOF of a signal originating at the source, external to the ego device.

As described above, TOF is the determination of the time that a signal (e.g. electromagnetic radiation) takes to propagate from a first point to a second point. In the following discussions of TOF, focus is placed for convenience primarily on generation and detection of radio signals and/or light signals; however, the skilled person will appreciate that the principles and methods disclosed herein can be applied to any source/sensor pairing as described above.

Because electromagnetic radiation travels at the speed of light, a TOF determination of an electromagnetic signal traveling from a first point to a second point can be readily covered to a distance between the first point and the second point as:

$$d = ct \tag{1}$$

wherein d is the distance between the first point (e.g. the source) and the second point (e.g. the ego device/sensor), c is the speed of light (e.g., 299,792,458 meters/second), and t is the TOF (e.g., the time that the signal took to propagate from the first point to the second point).

TOF is conventionally performed with Light Detection and Ranging (LIDAR) Systems, radiofrequency systems, and otherwise. Conventionally, the ego device, which will be referred to herein as the device receiving (e.g. detecting) the TOF signal, is also the device the generated the TOF signal. That is, a single LIDAR or radio device will conventionally generate a signal; detect a TOF of a reflection of the generated signal from an object; and then determine a distance between the ego device and the object based on the TOF (e.g. one half the distance in Formula 1, above or $$d = \frac{ct}{2}).$$

This disclosure primarily uses the terms "source device" and "ego device" to reference to the generator of the TOF signal and the receiver of the reflected TOF signal, respectively. Occasionally, reference is made specifically to LIDAR or radio systems for convenience. Such references notwithstanding, the principles and methods disclosed herein may be applied to any device performing TOF calculations, including, but not limited to, LIDAR, radios (e.g., transceivers), optical sensors, or acoustic/piezoelectric sensors (e.g. no longer relying on the speed of light, but instead on the speed of sound or otherwise on a reference value relating a speed with which a signal propagates through a medium.

Ego sensors may conventionally be programmed to disregard signals originating outside of the ego sensor. For example, a first LIDAR performing TOF distance detection may conventionally disregard signals received from a second LIDAR. This configuration ensures that distance calculations are performed based on the ego device's own signal; however, it precludes an ego device from determining a TOF for distance detection between the ego device and an object from using a signal generated by a source device that is external to the ego device and the object.

In many settings, however, it may be desirable to determine a distance between an ego device and an object based on a signal that originated external to the ego device. For example, it may be desired for a first device (e.g. a first LIDAR device) to determine a distance between the first device and an object, using a signal generated by a second device (e.g., a second LIDAR device). Such situations may be understood as applying to any of three cases. In a first case, the source device (e.g., the device generating the signal by which the TOF is performed) and the ego device are each equidistant from the point of reflection. In a second case, the source device leads the ego device (e.g., the distance between the source device and the point of reflection is greater than the distance between the ego device and the point of reflection. In a third case, the source device trails the ego device (e.g., the distance between the source device and the point of reflection is less than the distance between the ego device and the point of reflection.

For each of these cases, the source and ego devices may require a high degree of clock synchronization, since TOF calculation depends on clock synchronization, and variances in clocks (e.g. poor synchronization) between the source device and the ego device will translate directly into reduced accuracy of the TOF distance calculation. These devices may utilize any known synchronization method to implement the necessary synchronization. In a wireless (Wi-Fi) embodiment, Fine Timing Measurements (FTM) may optionally be used to synchronize nodes in wireless time-sensitive networks. These FTMs can also provide localization information for each of the source device and the ego device. For instance, the source device may act as a clock-leader, thereby providing both distance and time synchronization services to one or more other nodes (e.g. including the ego device).

FIG. 1 depicts TOF distance calculation according to the first case. In this figure, a source device 102 transmits a signal 103*a*, which strikes and is reflected 103*b* from object 106 to the ego device 104. Of particular note for the first case is that the distance between the source device 102 and the object 106 is equal to the distance between the object 106 and the ego device 104, as is depicted in 108. In this manner, the signal travels from the source device 102, to the object 106, and to the ego device 104 over a path that is twice the length of the distance between the ego device 104 and the object 106. The distance between the ego device 104 and the object 106 can thus be calculated from the TOF as:

$$d = \frac{tc}{2} \tag{2}$$

In this manner, the ego device may determine a distance between the ego device and an object using a signal from a source device, different from the ego device.

Before proceeding with the second and third cases, it is noted that the second and third cases require certain position or localization information of both the ego device and the source device. This position or localization information may be obtained through any known method. Such methods include, but are not limited to positioning with the Global Positioning System (GPS) (e.g. NAVSTAR GPS), the Global Navigation System (GLONASS), the BeiDou Navigation Satellite System, the Galileo Positioning System of the European Union, or otherwise. The devices may determine positioning or localization data via triangulation methods relative to two or more transmitters at known locations. Alternatively or additionally, the devices may receive positioning or localization information from one or more external devices, such as a camera system configured to detect the respective locations of the source and ego devices based on their locations in one or more images.

In some configurations, the source device and the ego device will have a fixed position relative to one another. For example, each of these devices may be installed or mounted at a particular location and therefore their distances and positions relative to one another will be known.

In an alternative configuration, the source device and the ego device may be wired or otherwise hard-connected (e.g., via a cable or wire) to one another and may share position data along this connection. For example, the source and ego devices may be configured to share their absolute positions, their positions relative to one or more reference points, their positions relative to one another, or their distance from one another and angle or orientations relative to a reference.

Alternatively or additionally, the source device and ego device may be configured to wirelessly communicate such position information to one another. For example, the source device and ego device may be configured to detect their absolute positions or positions relative to one or more reference points, and to wirelessly share this information with one another, or with one or more intermediaries from whom this information may be subsequently obtained (e.g. the source device shares the source device's position with an edge server from which the ego device receives the source device's position). This sharing of the known/detected position(s) may be performed using any protocol, without limitation. The position may be shared as part of the TOF signal or separate from the TOF signal.

As described above, the source device and the ego device may be configured to determine distances and/or orientations relative to one another. For the calculations relative to the second and third cases, it is necessary to determine relative positions of each of the source device and the sync device (e.g. relative to one another, relative to one or more reference points).

That is, for the principles and methods disclosed for the second and third cases, it is assumed that the source device and the ego device are able to localize each other's positions (e.g., the absolute distance between the source device and the ego device is known, from their own scans, infrastructure, or otherwise), such as, for example, by wireless triangulation or line of sight sensing. It is further assumed that the source device and/or the ego device may be able to detect the angle of the reflected signal and a facing direction of the source device and/or the ego device. It is noted that the angle of reflection of the signal is assumed herein to be normal (angle of incidence is equal to the angle of reflection) for ease of computations, although similar method can be applied for other angles.

Figure 2:
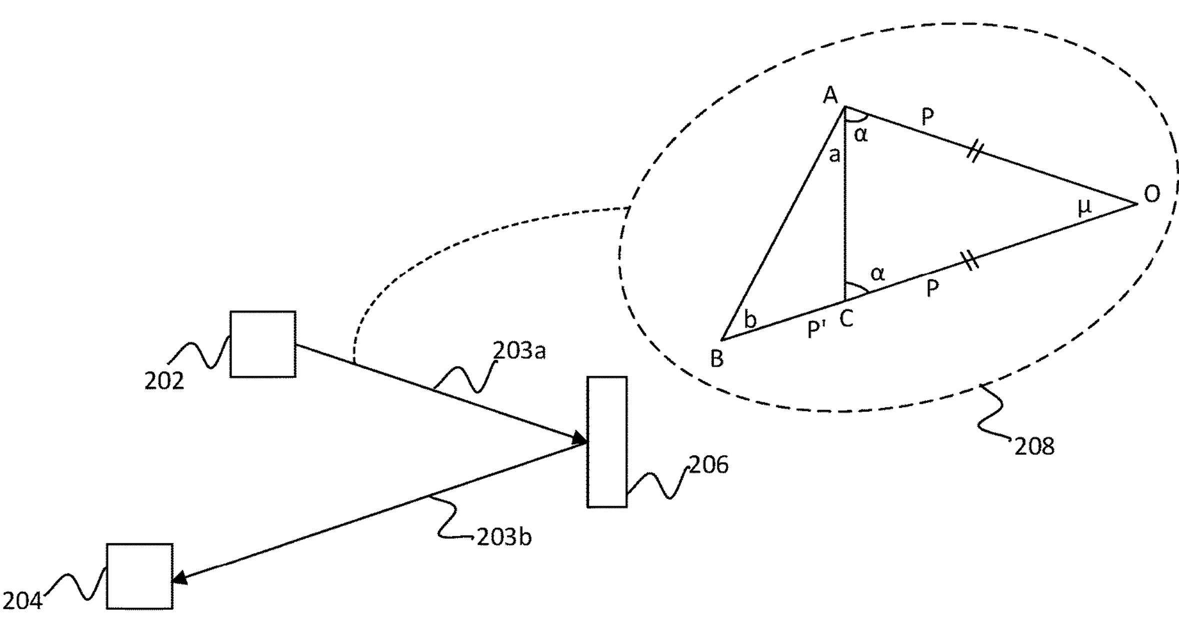
FIG. 2 depicts TOF distance calculation according to the second case.

Turning to the second case, FIG. 2 depicts a situation in which the source device 202 leads the ego device 204 and thus the distance between the source device 202 and the object 206 off of which the signal is reflected is less than the distance between the object 206 and the ego device 204. In this case, the reflected signal must travel a longer distance from the object 206 to the ego device 204 than from the source device 202 to the object 206. In this situation, it is desired to determine a distance P+P', which represents the distance between the ego device 204 and the object 206. As depicted herein, this can be achieved by constructing a triangle between points A (corresponding to the source device), B (corresponding to the ego device) and C, wherein AC is a line through points A and C that intersects the signal reflect so as to form an isosceles triangle AOC, wherein O is the object from which the signal is reflected.

Using the localization information as disclosed above, the length of AB is known. In light of this:

$$\angle OAC = \angle ACO = \alpha = URR \text{ source angle} \tag{3}$$

$$\angle ACB = 180 - \alpha \tag{4}$$

In light of this, the Law of Sines can be applied as follows:

$$\frac{AB}{\sin(\angle ACB)} = \frac{AC}{\sin(\angle ABC)} = \frac{P'}{\sin(\angle BAC)} \tag{5}$$

furthermore, since ∠ACB is known (φACB is 180-α), a constant k can be defined as:

$$k = \frac{AB}{\sin(180 - \alpha)} \tag{6}$$

As stated above, and using the localization information of the source device and the ego device, ∠BAC is also known. As such, P' can be derived as:

$$P' = k * \sin(\angle BAC) \tag{7}$$

In this manner:

$$TOF = P' + 2P \tag{8}$$

and therefore the distance between the ego device and the object can be calculated.

Figure 3:
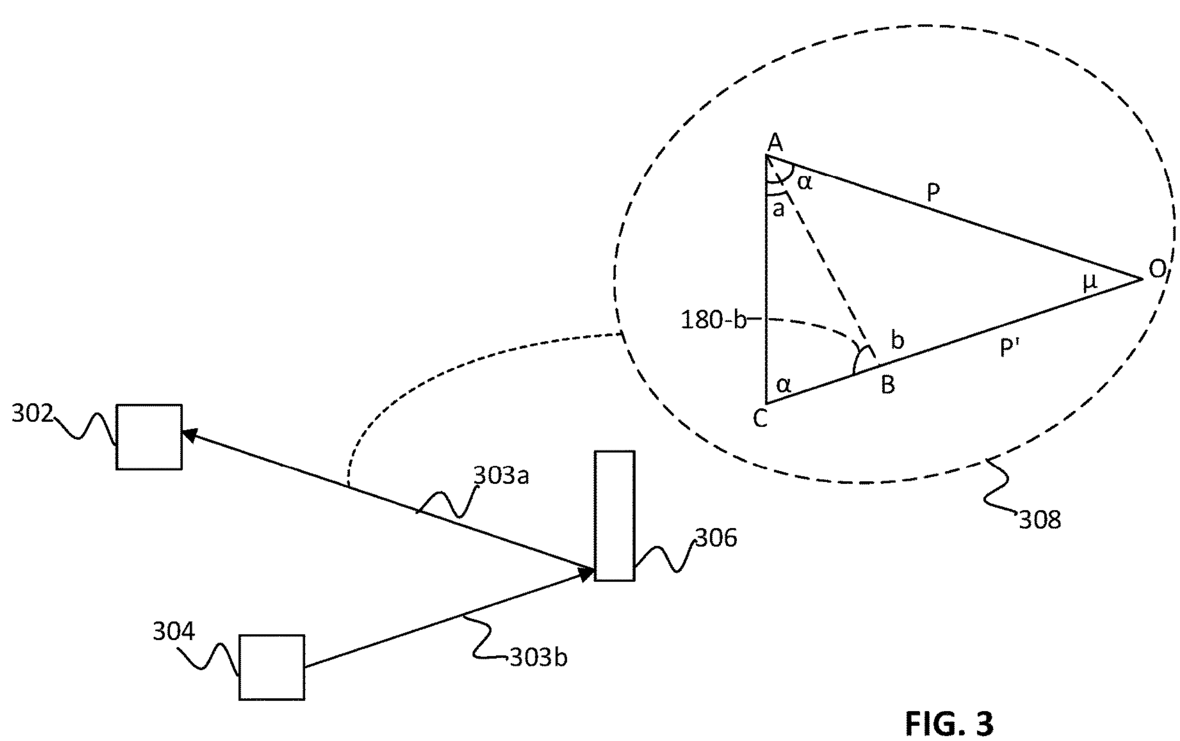
FIG. 3 depicts TOF distance calculation according to the third case.

FIG. 3 depicts the third case. In the third case, the source device 302 lags the ego device 304. The source device 302 sends a signal, which reflects from an object 306 and is detected by the ego device 304. The ego device 304 determines a distance between the ego device 304 and the object 306. In this figure, the source device corresponds to A, the object corresponds to O, and the ego device corresponds to B. C repents a point on an isosceles triangle (defined by AOC), such that the distance AO equals the distance OC.

As shown in FIG. 3, the distance between the source device 302 and the object 306 is greater than the distance between the object 306 and the ego device 304. To determine the distance between the ego device 304 and the object 306, an isosceles triangle AOC is used. Since the triangle is isosceles, then:

$$\angle CAO = \angle ACB = \alpha = \text{signal source angle} \tag{9}$$

$$\mu = 180 - 2\alpha \tag{10}$$

AB and AC are known from the localization data. For instance, Fine Time Measurement (FTM) can not only provide synchronization, but can also provide relative distances from the clock leader to the synchronized followers. Using the Law of Sines from triangle ACB along with α, each of ∠a and ∠b can also be determined. Specifically, using the Law of Sines, the following is true:

$$\frac{AB}{\sin(\angle\alpha)} = \frac{AC}{\sin(\angle(180 - b)))} = \frac{CB}{\sin(\alpha))} \tag{11}$$

Furthermore, using the Law of Sines on triangle AOB, the following is true:

$$\frac{P'}{\sin(\alpha - a)} = \frac{P}{\sin(b)} = \frac{AB}{\sin(\mu))} \tag{12}$$

A constant k can be defined as:

$$k = \frac{AB}{\sin(\mu))} \tag{13}$$

Using formulas (10), (12), and (13), the distance between the ego device 304 and the object 306 can be determined as:

$$P = k * \sin(b) \tag{14}$$

$$P' = k * \sin(\alpha - a) \tag{15}$$

Although attention is paid in this disclosure to time sensitive networks to exemplify the concept of synchronization and localization of the source device, various other techniques may be used to achieve the same or similar result. For example, in radar devices, synchronization may be achieved by using a chirp sequence modulation. Moreover, in an environment in which a plurality of transmitters exists, it may be desirable to identify the source of the transmitted signal (e.g., to identify the source device, to distinguish the source device from other devices). For this, any of a plurality of existing identification techniques (e.g., known techniques in RADAR or LIDAR) may be used. Such techniques may, for instance, modulate the unique identifier in the signal or use out of band methods to send identification to the receivers.

Figure 4:
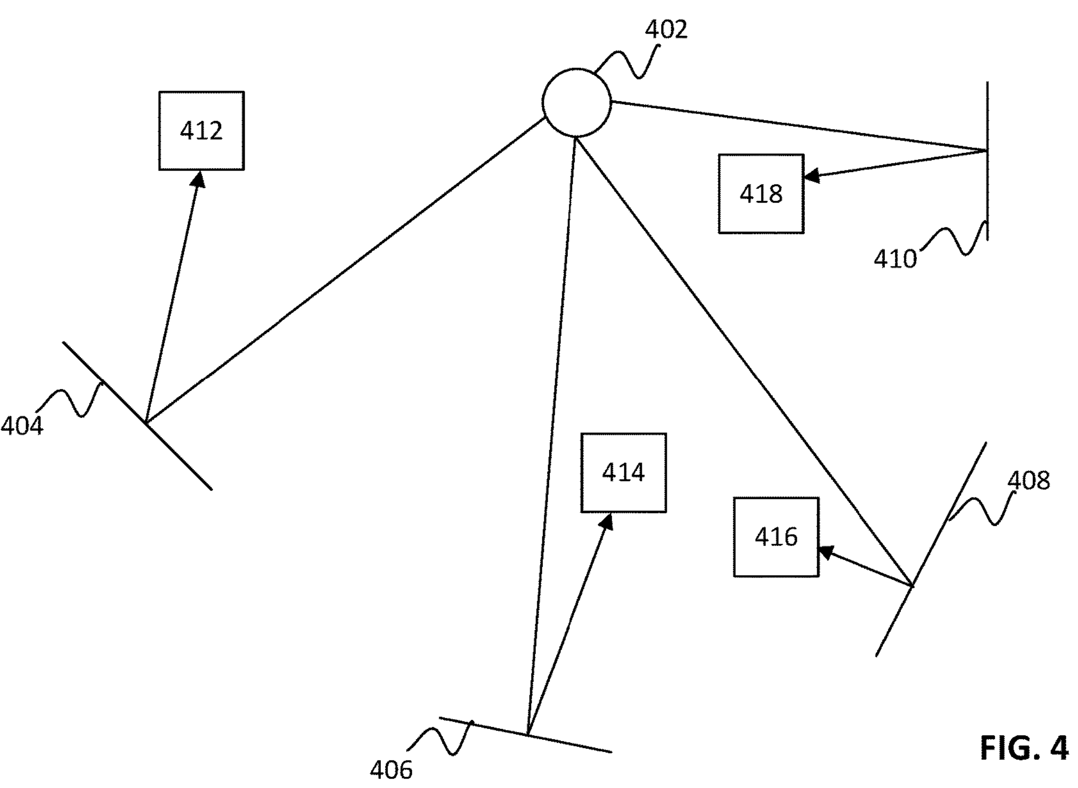
FIG. 4 depicts a single source device and a plurality of ego devices.

Although the principles and methods disclosed herein have been described relative to a single source device and a single ego device, these principles and methods may alternatively be utilized with a single source device and a plurality of ego devices, as depicted in FIG. 4. In this figure, source device 402 sends one or more TOF signals in a plurality of directions. These may be targeted signals, such as one or more lasers directed at specific locations, or untargeted signals (e.g. broadcast signals) sent simultaneously in multiple directions. In this exemplary configuration, the source device 402 broadcasts a signal in multiple directions, such that the signal strikes first object 404, second object 406, third object 416, and fourth object 418. First ego device 412, second ego device 414, third ego device 416, and fourth ego device 418, determine a distance to the first object 414, the second object 416, the third object 418, and the fifth object 410, respectively, using the principles and methods disclosed herein based on whether the relationship of the source device 402, the relevant object, and the relevant ego device corresponds to the first case, the second case, or the third case, as disclosed herein.

In a further exemplary configuration, the ego device may be configured as a virtual reality headset or an augmented reality headset that is configured to perform distance determination using the principles and methods disclosed herein based on a signal from an external source. In this manner, virtual reality and/or augmented reality headsets may be manufactured without a source (e.g. without the requisite laser or other generator of electromagnetic radiation, sound, etc.). Alternatively, such virtual reality and/or augmented reality headsets may be manufactured with the requisite source, but they may be configured to save battery power by detecting reflections from one or more external sources rather than generating the source signal themselves.

In any of the above configurations, one or more ego devices and the source device may be optionally connected to an external server or other device, such as an edge server. In this manner, localization information relevant to the source and/or the ego devices may be transmitted between devices.

Figure 5:
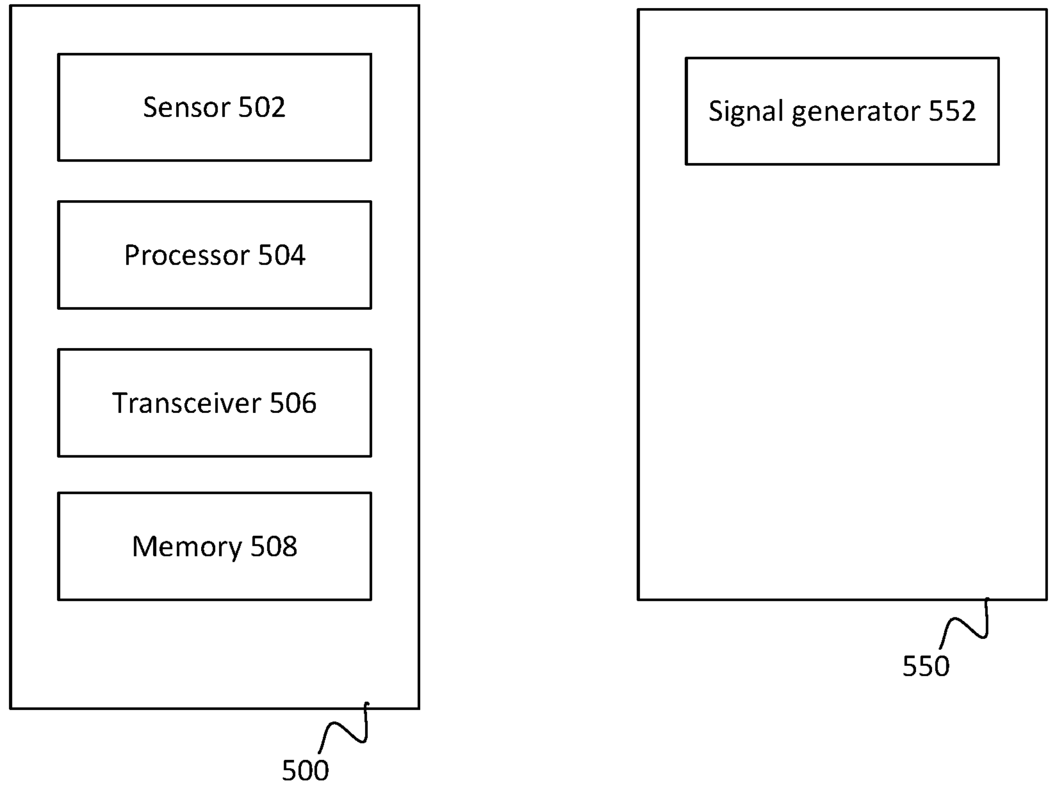
FIG. 5 depicts a device for TOF calculation.

FIG. 5 depicts a device 500 that includes a sensor 502, configured to detect electromagnetic radiation originating from a source external to the device and reflected from an object; and to generate an electrical signal representing the detected electromagnetic radiation; and a processor 504, configured to determine a distance between the device and the object based on the electrical signal. The processor 504 may be further configured to determine the distance between the device 500 and the object based on the electrical signal and a position of the source. The device 500 may further include a transceiver 506, which may be configured to receive a wireless signal representing a position of the source. In this manner, the processor 504 determining the distance between the device and the object based on the electrical signal and the position of the source may include the processor 504 determining the distance using the position of the source received in the wireless signal.

The processor 504 may be further configured to perform a synchronization operation, wherein the synchronization operation includes the processor 504 synchronizing a clock of the device with a clock of the origin. The synchronization operation may optionally be a Time-Sensitive Networking operation according to The Institute of Electrical and Electronics Engineers (IEEE) 802.1AS.

The processor 504 may be configured to determine an angle of arrival of the detected electromagnetic radiation. The processor 504 may be configured to determine the distance between the device 500 and the object based on the electrical signal and the angle of arrival. The processor 504 may be configured to determine the distance between the device and the object based on the electrical signal, the angle of arrival, and the distance between the device and the source.

If the device 500 and the source are equidistant to the object (e.g., the first case), the processor may be configured to operate according a first operational mode. If the distance between the source and the object is less than a distance between the device 500 and the object (e.g., the second case), the processor may be configured to operate according a second operational mode. If the distance between the source and the object is greater than a distance between the device 500 and the object (e.g., the third case), the processor may be configured to operate according a third operational mode.

The processor 504 operating according to the first operational mode may include the processor determining the distance between the device and the object as $$d = \frac{c \cdot t}{2}$$

wherein d is the distance, c is a speed of light, and t is a time of flight.

The processor operating according to the second operational mode may include the processor 504 determining the distance between the device 500 and the object as a sum of a first distance between the device and a point along a first line between the device and the object, and a second distance between the point and the object; wherein the point is a point of intersection between the first line and a second line, wherein the second line intersects the source and is perpendicular to a normal of the object relative to the angle of reflection.

The processor operating according to the third operational mode may include the processor determining the distance between the device and the object as a difference of a first distance between the source and the object and a second distance between the device and a point. The point is a point of intersection between a path of reflection from the object of the detected electromagnetic radiation and a line that intersects the source and is perpendicular to a normal of the object relative to the angle of reflection.

The device 500 may be configured as a LIDAR device; however, the device 500 may optionally be configured as a RADAR device (e.g., TOF using radio signals), or even an acoustic device (e.g., TOF using acoustic waves). In any of these configurations, the device 500 may be optionally configured as a virtual reality headset or an augmented reality headset.

In any of these configurations, the device 500 may include a memory 508. The processor 504 may be configured to store data representing the detected signal and any determinations made with the calculations as described above.

The memory 508 may be or include a non-transitory computer readable medium. which may include instructions which, if executed by the processor 504, may cause the processor to perform any of the actions described herein. In particular, the instructions may cause the processor 504 to determine a distance between the device and the object based on the electrical signal.

The device may be optionally configured to operate with a signal generation device 550. The signal generation device 550 may include a signal generator 552, which may be configured to generate and send the TOF signal to be reflected from the object and detected by the device 500. The signal generation device 550 may be any kind of device to generate a signal complementary to the type of device 500. For example, if the device 500 is configured as a LIDAR, the signal generation device 550 may be configured to generate a LIDAR signal (e.g., a laser signal) with the signal generator 552. If the device 500 is configured as a RADAR, the signal generation device 550 may be configured to generate the radio signal. If the device 500 is configured as an acoustic detection device, the signal generation device 550 may be configured to generate the acoustic signal.

Figure 6:
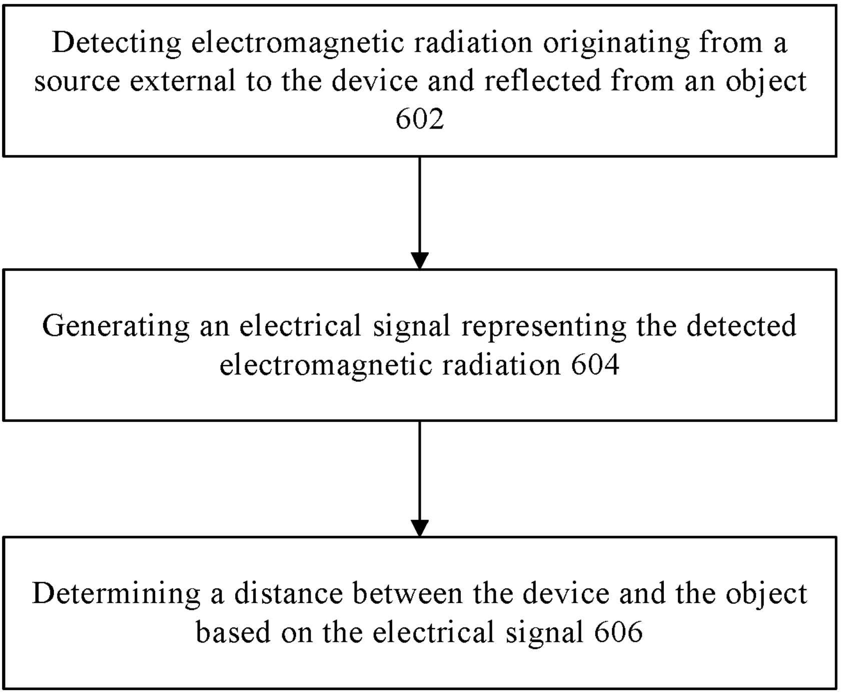
FIG. 6 depicts a method according to an aspect of the disclosure.

FIG. 6 depicts a method including detecting electromagnetic radiation originating from a source external to the device and reflected from an object 602; generating an electrical signal representing the detected electromagnetic radiation 604; and determining a distance between the device and the object based on the electrical signal 606. The method may further include determining the distance between the device and the object based on the electrical signal and a position of the source. The method may further include receiving a wireless signal representing a position of the source, determining the distance between the device and the object based on the electrical signal and the position of the source received in the wireless signal.

Further aspects of the disclosure will be explained by way of examples:

In Example 1, a device comprising a sensor, configured to detect electromagnetic radiation originating from a source external to the device and reflected from an object; and to generate an electrical signal representing the detected electromagnetic radiation; a processor, configured to determine a distance between the device and the object based on the electrical signal.

In Example 2, the device of Example 1, wherein the processor is further configured to determine the distance between the device and the object based on the electrical signal and a position of the source.

In Example 3, the device of Example 2, further comprising a transceiver, configured to receive a wireless signal representing a position of the source, and wherein the processor determining the distance between the device and the object based on the electrical signal and the position of the source comprises the processor determining the distance using the position of the source received in the wireless signal.

In Example 4, the device of Example 1 or 3, wherein the processor is further configured to perform a synchronization operation, wherein the synchronization operation comprises the processor synchronizing a clock of the device with a clock of the origin.

In Example 5, the device of Example 4, wherein the synchronization operation is a Time-Sensitive Networking operation according to The Institute of Electrical and Electronics Engineers (IEEE) 802.1AS.

In Example 6, the device of any one of Examples 1 to 5, wherein the processor determining the distance between the device and the object based on the electrical signal comprises the processor determining a duration between generation of the signal and receipt of the signal, and calculating the distance with the duration.

In Example 7, the device of any one of Examples 1 to 6, wherein the processor is configured to determine an angle of arrival of the detected electromagnetic radiation; and wherein the processor is configured to determine the distance between the device and the object based on the electrical signal and the angle of arrival.

In Example 8, the device of Example 7, wherein the processor is configured to determine the distance between the device and the object based on the electrical signal, the angle of arrival, and the distance between the device and the source.

In Example 9, the device of any one of Examples 1 to 8, wherein if the source and the device are equidistant to the object, the processor is configured to operate according a first operational mode; wherein if the distance between the source and the object is less than a distance between the device and the object, the processor is configured to operate according a second operational mode; and wherein if the distance between the source and the object is greater than a distance between the device and the object, the processor is configured to operate according a third operational mode.

In Example 10, the device of Example 9, wherein the processor operating according to the first operational mode comprises the processor determining the distance between the device and the object as $$d = \frac{c \cdot t}{2}$$

wherein d is the distance, c is a speed of light, and t is a time of flight.

In Example 11, the device of Example 9 or 10, wherein the processor operating according to the second operational mode comprises the processor determining the distance between the device and the object as a sum of a first distance between the device and a point along a first line between the device and the object, and a second distance between the point and the object; wherein the point is a point of intersection between the first line and a second line, wherein the second line intersects the source and is perpendicular to a normal of the object relative to the angle of reflection.

In Example 12, the device of Example 10, wherein the processor operating according to the third operational mode comprises the processor determining the distance between the device and the object as a difference of a first distance between the source and the object and a second distance between the device and a point, wherein the point is a point of intersection between a path of reflection from the object of the detected electromagnetic radiation and a line that intersects the source and is perpendicular to a normal of the object relative to the angle of reflection.

In Example 13, the device of any one of Examples 1 to 12, wherein the device is configured as a light detection and ranging (LIDAR) device.

In Example 14, the device of any one of Examples 1 to 13, wherein the device is configured as a virtual reality headset or an augmented reality headset.

In Example 15, a method comprising: detecting electromagnetic radiation originating from a source external to the device and reflected from an object; generating an electrical signal representing the detected electromagnetic radiation; and determine a distance between the device and the object based on the electrical signal.

In Example 16, the method of Example 15, wherein further comprising determining the distance between the device and the object based on the electrical signal and a position of the source.

In Example 17, the method of Example 16, further comprising receiving a wireless signal representing a position of the source, determining the distance between the device and the object based on the electrical signal and the position of the source received in the wireless signal.

In Example 18, the method of Example 15 or 17, further comprising performing a synchronization operation, wherein the synchronization operation comprises the processor synchronizing a clock of the device with a clock of the origin.

In Example 19, the method of Example 18, wherein the synchronization operation is a Time-Sensitive Networking operation according to The Institute of Electrical and Electronics Engineers (IEEE) 802.1AS.

In Example 20, the method of any one of Examples 15 to 19, wherein determining the distance between the device and the object based on the electrical signal comprises the determining a duration between generation of the signal and receipt of the signal, and calculating the distance with the duration.

In Example 21, the method of any one of Examples 15 to 20, further comprising determining an angle of arrival of the detected electromagnetic radiation and determining the distance between the device and the object based on the electrical signal and the angle of arrival.

In Example 22, the method of Example 21, further comprising determining the distance between the device and the object based on the electrical signal, the angle of arrival, and the distance between the device and the source.

In Example 23, the method of any one of Examples 15 to 22, further comprising, wherein if the source and the device are equidistant to the object, operating according a first operational mode; wherein if the distance between the source and the object is less than a distance between the device and the object, operating according a second operational mode; and wherein if the distance between the source and the object is greater than a distance between the device and the object, operating according a third operational mode.

In Example 24, the method of Example 23, wherein operating according to the first operational mode comprises determining the distance between the device and the object as $$d = \frac{c \cdot t}{2}$$

wherein d is the distance, c is a speed of light, and t is a time of flight.

In Example 25, the method of Example 23 or 24, wherein operating according to the second operational mode comprises determining the distance between the device and the object as a sum of a first distance between the device and a point along a first line between the device and the object, and a second distance between the point and the object; wherein the point is a point of intersection between the first line and a second line, wherein the second line intersects the source and is perpendicular to a normal of the object relative to the angle of reflection.

In Example 26, the method of Example 24, wherein operating according to the third operational mode comprises determining the distance between the device and the object as a difference of a first distance between the source and the object and a second distance between the device and a point, wherein the point is a point of intersection between a path of reflection from the object of the detected electromagnetic radiation and a line that intersects the source and is perpendicular to a normal of the object relative to the angle of reflection.

In Example 27, a non-transitory computer readable medium comprising instructions which, if executed by one or more processors, cause the one or more processors to: determine a distance between a device and the object using an electrical signal; wherein the electrical signal originates from a source external to the device and is reflected from the object to the device.

In Example 28, the non-transitory computer readable medium of Example 27, wherein the instructions are further configured to cause the processor to determine the distance between the device and the object based on the electrical signal and a position of the source.

In Example 29, the non-transitory computer readable medium of Example 28, wherein the instructions are further configured to cause the one or more processors to determine the distance between the device and the object based on the electrical signal and the position of the source by determining the distance using the position of the source received in the wireless signal.

In Example 30, the non-transitory computer readable medium of Example 27 or 29, wherein the instructions are further configured to cause the one or more processors to perform a synchronization operation, wherein the synchronization operation comprises the processor synchronizing a clock of the device with a clock of the origin.

In Example 31, the non-transitory computer readable medium of Example 30, wherein the synchronization operation is a Time-Sensitive Networking operation according to The Institute of Electrical and Electronics Engineers (IEEE) 802.1AS.

In Example 32, the non-transitory computer readable medium of any one of Examples 27 to 31, wherein the instructions are configured to cause the one or more processors to determine the distance between the device and the object based on the electrical signal by determining a duration between generation of the signal and receipt of the signal, and calculating the distance with the duration.

In Example 33, the non-transitory computer readable medium of any one of Examples 27 to 32, wherein the instructions are further configured to cause the one or more processors to determine an angle of arrival of the detected electromagnetic radiation; and wherein the instructions are further configured to cause the one or more processors to determine the distance between the device and the object based on the electrical signal and the angle of arrival.

In Example 34, the non-transitory computer readable medium of Example 33, wherein the instructions are further configured to cause the one or more processors to determine the distance between the device and the object based on the electrical signal, the angle of arrival, and the distance between the device and the source.

In Example 35, the non-transitory computer readable medium of any one of Examples 27 to 34, wherein the instructions are further configured to cause the one or more processors to operate according a first operational mode if the source and the device are equidistant to the object, wherein the instructions are further configured to cause the one or more processors to operate according a second operational mode if the distance between the source and the object is less than a distance between the device and the object; and wherein the instructions are further configured to cause the one or more processors to operate according a third operational mode if the distance between the source and the object is greater than a distance between the device and the object.

In Example 36, the non-transitory computer readable medium of Example 35, wherein the operating according to the first operational mode comprises the instructions causing the processor to determine the distance between the device and the object $$d = \frac{c \cdot t}{2}$$

wherein d is the distance, c is a speed of light, and t is a time of flight.

In Example 37, the non-transitory computer readable medium of Example 35 or 36, wherein operating according to the second operational mode comprises the instructions causing the processor to determine the distance between the device and the object as a sum of a first distance between the device and a point along a first line between the device and the object, and a second distance between the point and the object; wherein the point is a point of intersection between the first line and a second line, wherein the second line intersects the source and is perpendicular to a normal of the object relative to the angle of reflection.

In Example 38, the non-transitory computer readable medium of Example 36, wherein operating according to the third operational mode comprises the instructions causing the processor to determine the distance between the device and the object as a difference of a first distance between the source and the object and a second distance between the device and a point, wherein the point is a point of intersection between a path of reflection from the object of the detected electromagnetic radiation and a line that intersects the source and is perpendicular to a normal of the object relative to the angle of reflection.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is expressly noted that any of the steps described herein may be performed by one or more processers. Alternatively or additionally, software may be configured to cause one or more processors to perform any one or more steps or procedures disclosed herein. This software may be stored on non-transitory computer readable medium, and in this manner, the non-transitory computer readable medium may include instructions which, if executed by the one or more processors, cause the one or more processors to perform any or any combination of the steps and/or procedures disclosed herein.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising:

a sensor, configured to detect electromagnetic radiation that originated from a source external to the device and was reflected from an object; and to generate an electrical signal representing the detected electromagnetic radiation;

a processor, configured to determine a distance between the device and the object based on the electrical signal;

wherein the processor is further configured to determine the distance between the device and the object based on the electrical signal and a position of the source further comprising a transceiver, configured to receive a wireless signal representing a position of the source, and wherein the processor determining the distance between the device and the object based on the electrical signal and the position of the source comprises the processor determining the distance using the position of the source received in the wireless signal.

2. The device of claim 1, wherein the processor is further configured to perform a synchronization operation, wherein the synchronization operation comprises the processor synchronizing a clock of the device with a clock of the source.

3. The device of claim 2, wherein the synchronization operation is a Time-Sensitive Networking operation according to The Institute of Electrical and Electronics Engineers (IEEE) 802.1AS.

4. The device of claim 1, wherein the processor determining the distance between the device and the object based on the electrical signal comprises the processor determining a duration between generation of the signal and receipt of the signal, and calculating the distance with the duration.

5. The device of claim 1, wherein the processor is configured to determine an angle of arrival of the detected electromagnetic radiation; and wherein the processor is configured to determine the distance between the device and the object based on the electrical signal and the angle of arrival.

6. The device of claim 5, wherein the processor is configured to determine the distance between the device and the object based on the electrical signal, the angle of arrival, and the distance between the device and the source.

7. The device of claim 1, wherein if the source and the device are equidistant to the object, the processor is configured to operate according a first operational mode; wherein if the distance between the source and the object is less than a distance between the device and the object, the processor is configured to operate according a second operational mode; and wherein if the distance between the source and the object is greater than a distance between the device and the object, the processor is configured to operate according a third operational mode.

8. The device of claim 7, wherein the processor operating according to the first operational mode comprises the processor determining the distance between the device and the object as $$d = \frac{c \cdot t}{2}$$

wherein a is the distance, c is a speed of light, and t is a time of flight.

9. The device of claim 8, wherein the processor operating according to the third operational mode comprises the processor determining the distance between the device and the object as a difference of a first distance between the source and the object and a second distance between the device and a point, wherein the point is a point of intersection between a path of reflection from the object of the detected electromagnetic radiation and a line that intersects the source and is perpendicular to a normal of the object relative to the angle of reflection.

10. The device of claim 7, wherein the processor operating according to the second operational mode comprises the processor determining the distance between the device and the object as a sum of a first distance between the device and a point along a first line between the device and the object, and a second distance between the point and the object; wherein the point is a point of intersection between the first line and a second line, wherein the second line intersects the source and is perpendicular to a normal of the object relative to the angle of reflection.

11. The device of claim 1, wherein the device is configured as a light detection and ranging (LIDAR) device.

12. The device of claim 1, wherein the device is configured as a virtual reality headset or an augmented reality headset.

13. A method comprising:

detecting electromagnetic radiation that originated from a source external to the device and was reflected from an object;

generating an electrical signal representing the detected electromagnetic radiation;

determine a distance between the device and the object based on the electrical signal;

determining an angle of arrival of the detected electromagnetic radiation; and determining the distance between the device and the object based on the electrical signal and the angle of arrival.

14. The method of claim 13, wherein further comprising determining the distance between the device and the object based on the electrical signal and a position of the source.

15. A non-transitory computer readable medium comprising instructions which, if executed by one or more processors, cause the one or more processors to:

determine a distance between a device and the object using an electrical signal;

wherein the electrical signal originate d from a source external to the device and was reflected from the object to the device;

determine an angle of arrival of the detected electromagnetic radiation; and determine the distance between the device and the object based on the electrical signal and the angle of arrival.

16. The non-transitory computer readable medium of claim 15, wherein the instructions are further configured to cause the processor to determine the distance between the device and the object based on the electrical signal and a position of the source.

17. The non-transitory computer readable medium of claim 16, wherein the instructions are further configured to cause the one or more processors to determine the distance between the device and the object based on the electrical signal and the position of the source by determining the distance using the position of the source received in the wireless signal.

18. The non-transitory computer readable medium of claim 15, wherein the instructions are further configured to cause the one or more processors to perform a synchronization operation, wherein the synchronization operation comprises the processor synchronizing a clock of the device with a clock of the source.

* * * * *